Aug. 2, 1932.　　　J. W. WHITE　　　1,869,452
HYDRAULIC BRAKE SYSTEM
Filed Aug. 10, 1925
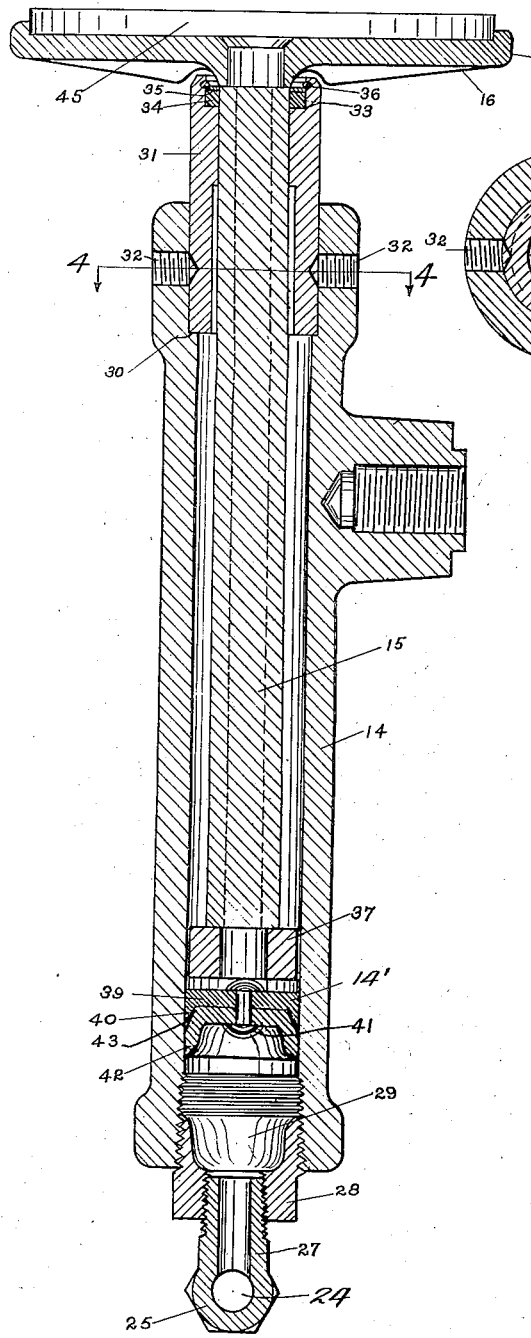
FIG. 1.
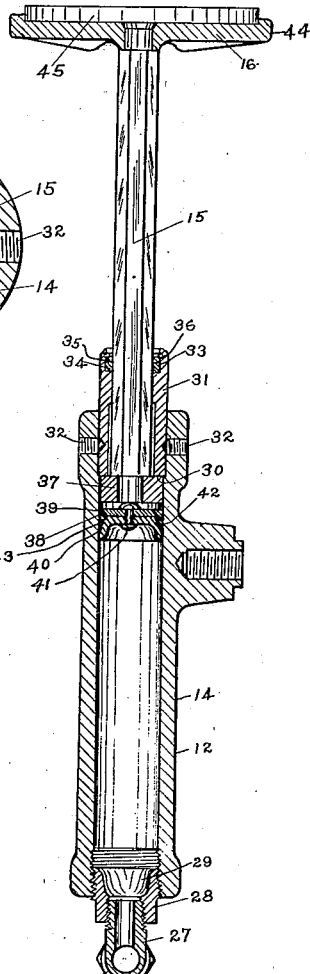
FIG. 4.
FIG. 2.
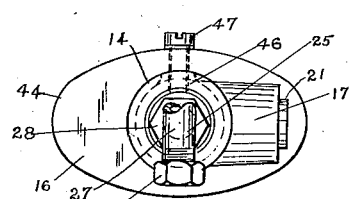
FIG. 3.
Inventor
JOHN W. WHITE
By Clarence S. Walker
His Attorney Patented Aug. 2, 1932

1,869,452

UNITED STATES PATENT OFFICE

JOHN WILLIAM WHITE, OF BUFFALO, NEW YORK

HYDRAULIC BRAKE SYSTEM

Application filed August 10, 1925. Serial No. 49,391.

This invention relates to an improvement in motor vehicles, and more particularly to a pedal mechanism for a hydraulic brake installation.

Prior to this invention it has been the universal practice commercially to provide a cylinder in the fluid circuit of a hydraulic brake installation and to provide a pedal connected mechanically by means of links and levers with the piston of the cylinder.

The primary object of this invention is to provide in place of the cylinder and mechanical connections mentioned simple hydraulic means for actuating the hydraulic brakes.

A further object of this invention is to provide a pedal which comprises a booster cylinder located in the fluid circuit of the hydraulic brake installation and having a piston the depression of which exerts pressure directly upon the fluid of the circuit and so operates the brakes.

Other objects of this invention will appear from a consideration of the following specification taken in connection with the accompanying drawing, which forms a part thereof, and in which Fig. 1 is a longitudinal section on an enlarged scale of the mechanism with the piston completely depressed;

Fig. 2 is a similar view on a smaller scale with the piston completely raised into the normal position;

Fig. 3 is a bottom plan view of the mechanism; and

Fig. 4 is a cross sectional view along the line 4—4 of Fig. 1.

Referring now to the drawing it will be noted that the numeral 14 designates a casing and 14' a piston having a rod 15 at the upper end of which is mounted a pedal 16. The numeral 24 is used to designate a portion of the circuit through which fluid passes to the brakes and into which is introduced the T-tap 25. The ends of the tap are secured to the ends of the circuit 24 by means of unions 26 so that the tap forms a part of the circuit. The central portion 27 of the tap is threaded into an externally and internally threaded nut 28, which is in turn threaded into the lower end of the casing 14. Thus the chamber 29 of the casing is an element of the circuit 24 and is also filled with fluid.

At the upper end of the casing 14 is formed an annular seat 30, on which rests the end of a sleeve 31. Set screws 32 secure the sleeve 31 in position. The rod 15 is preferably non-circular, here shown as hexagonal, and the upper portion of the sleeve has a similar contour, thus preventing the rod from rotating in the sleeve. Since the sleeve 31 is fixed in the casing by the set screws 32 the rod and its plate 16 cannot turn in the casing 14. This is particularly important when the oval plate 16 illustrated in the drawing is used. At a recess 33 in the upper end of the sleeve is introduced a gasket 34 held in place by an annular disc 35 and a split ring 36. The gasket acts to prevent entry of air into the cylinder or casing.

Secured to the inner end of the rod 15 is a metal ring 37, which has a free movement in the casing 14 and prevents any tilting of the rod 15. Mounted for reciprocation within the casing below the rod is the piston 14' comprising a disc 39 and a rubber cup shaped member 40 joined to the disk at the center by a rivet 41.

It has been found that there is a tendency for the cup 40 to expand at the base under pressure and consequently cause binding between the piston and the casing. To overcome this and at the same time not interfere with the function of the lip 42 of the rubber cup the disc 39 is provided with an annular flange 43, which confines the base of the cup and prevents its expansion laterally under pressure. The lip 42, however, is free to bear against the walls of the casing and seal the chamber 29. The purpose of this construction will be pointed out below in connection with the statement of operation.

The foot plate 16 has an integral peripheral flange 44 which positions a resilient pad 45. At the base of the casing 14 is provided an opening 46 normally closed by the screw 47, which opening serves as a bleed valve to permit the escape of air when the casing is being filled with liquid.

The normal position of the parts of the mechanism is illustrated in Fig. 2, and it will be understood that the casing 14 below the piston 14' is filled with fluid and is in free direct open communication with the circuit 24. Obviously by applying pressure to the plate 16 the piston is depressed forcing the fluid from the chamber 29 into the circuit, and thus exerting pressure upon the brakes in the usual manner. When the pressure is released, the fluid will tend to resume its normal condition and will act upon the piston rod forcing it to rise with the piston to its original position shown in Figure 2.

Under certain conditions the pedal may rise slowly and there is a tendency on the part of some operators to lift the pedal by placing the toe under the plate. Obviously the piston should only rise as fast as the fluid is returned and any attempt to lift it bodily is liable to admit air into the circuit which would affect deleteriously its functions. For this reason in the mechanically operated pedal mechanism referred to above as in general use there is provided a loose link connection outside the cylinder which permits this positive lifting of the pedal without damage. The provision of the piston separate from and independent of the piston rod 15 functions as a loose link connection for this reason, the connection, however, being inside the cylinder. The piston can rise only as fast as the fluid is returned, but the pedal can be lifted positively if desired without in any way affecting the operation of the cup.

The position of the pedal when pressure is relieved is a positive indication of the amount of fluid in the circuit, so that the operator is advised at all times of its condition. This indicator function is far more delicate than that of the old commercial type of pedal, because in the latter it is necessary to provide a plurality of links and levers in order to attain the proper travel for the piston in the cylinder, whereas in this mechanism the full travel is provided at the pedal.

While one embodiment of this invention has been shown and described, applicant is not limited thereto, since it is obvious that other embodiments can be made without departing from the spirit and scope of this invention as set forth in the following claims.

Having thus set forth my invention what I claim as new and for which I desire protection by Letters Patent is:

1. In a hydraulic brake system, a pressure inducing instrumentality including, a cylinder, a piston rod in said cylinder, a substantially cup-shaped flexible piston in advance and independent of said rod, and a disc interposed between the end of the rod and cup-shaped member, said disc having an annular flange surrounding the base portion of the cup-shaped member for supporting the latter.

2. In a hydraulic brake system, a pressure inducing instrumentality including, a cylinder, a piston rod in said cylinder, a substantially cup-shaped flexible piston in advance and independent of said rod, a disc also independent of the rod and interposed between the end of the rod and cup-shaped member, said disc having an annular flange surrounding the base portion of the cup-shaped member for supporting the latter, and a pedal secured to the outer end of said rod for actuating the latter.

3. In a hydraulic brake system, a pressure inducing instrumentality including, a cylinder, a piston rod extending within the cylinder, a ring carried by the inner end of said rod and slidably engaging the walls of the cylinder for restricting movement of the rod in a rectilinear path, a substantially cup-shaped flexible piston arranged within the cylinder in advance and independent of the rod, a disc interposed between the end of the rod and cup-shaped member and having an annular flange surrounding the cup-shaped member for supporting the latter and means for actuating the rod and piston.

4. In a hydraulic brake system, a pressure inducing instrumentality including, a cylinder, a piston rod in said cylinder, an inverted substantially cup-shaped flexible piston in advance and independent of the rod, a disc interposed between the end of the rod and cup-shaped member, said disc slidably engaging the walls of the cylinder and secured to the base portion of the cup-shaped member, and an annular flange upon said disc surrounding a portion of the cup-shaped member for supporting the latter.

In testimony whereof I have affixed my signature.

JOHN WILLIAM WHITE.